(12) United States Patent
Webster

(10) Patent No.: US 10,203,023 B2
(45) Date of Patent: Feb. 12, 2019

(54) GEAR TRAINS

(71) Applicant: ROLLS-ROYCE plc, London (GB)

(72) Inventor: John Richard Webster, Derby (GB)

(73) Assignee: ROLLS-ROYCE plc, London (GB)

( * ) Notice: Subject to any disclaimer, the term of this patent is extended or adjusted under 35 U.S.C. 154(b) by 190 days.

(21) Appl. No.: 15/235,832

(22) Filed: Aug. 12, 2016

(65) Prior Publication Data

US 2017/0074356 A1 Mar. 16, 2017

(30) Foreign Application Priority Data

Sep. 10, 2015 (GB) .................................. 1516016.1

(51) Int. Cl.
| | |
|---|---|
| F02C 7/36 | (2006.01) |
| F16H 1/46 | (2006.01) |
| F02K 3/04 | (2006.01) |
| F16H 1/28 | (2006.01) |
| F16H 57/08 | (2006.01) |

(52) U.S. Cl.
CPC ................. *F16H 1/46* (2013.01); *F02C 7/36* (2013.01); *F02K 3/04* (2013.01); *F05D 2240/35* (2013.01); *F05D 2260/40311* (2013.01); *F16H 1/2809* (2013.01); *F16H 57/082* (2013.01)

(58) Field of Classification Search
CPC ........ F16H 57/082; F16H 1/46; F16H 1/2809; F02K 3/04; F02C 7/36; F05D 2260/40311
USPC .................................................. 475/330, 331
See application file for complete search history.

(56) References Cited

U.S. PATENT DOCUMENTS

| | | | |
|---|---|---|---|
| 2,844,052 A | 7/1958 | Stoeckicht | |
| 4,768,400 A * | 9/1988 | McKay | .................... F16H 19/00 475/330 |
| 4,825,723 A | 5/1989 | Martin | |
| 5,466,198 A | 11/1995 | McKibbin et al. | |
| 5,480,362 A * | 1/1996 | Tanaka | ................ F16H 57/0479 475/325 |
| 5,518,466 A | 5/1996 | Tiedeman | |
| 6,338,691 B1 | 1/2002 | Morrow | |
| 6,852,060 B1 | 2/2005 | Ash | |
| 8,096,917 B2 | 1/2012 | Benito | |
| 8,118,702 B2 * | 2/2012 | Hansson | ................. B25B 21/00 173/216 |
| 8,192,323 B2 * | 6/2012 | Fox | ....................... F16H 1/2836 475/347 |

(Continued)

OTHER PUBLICATIONS

Mar. 9, 2016 Search Report issued in British Patent Application No. 1516016.1.

*Primary Examiner* — Roger L Pang
(74) *Attorney, Agent, or Firm* — Oliff PLC

(57) ABSTRACT

A gear train comprising: an input shaft; a first sun gear coupled to the input shaft; a plurality of first planet gears engaging the first sun gear; a first ring gear engaging the plurality of first planet gears; and a first planet carrier coupled to the plurality of first planet gears; a second sun gear coupled to the input shaft; a plurality of second planet gears engaging the second sun gear; a second ring gear engaging the plurality of second planet gears; and a second planet carrier coupled to the plurality of second planet gears; and an output member coupled to the first planet carrier at a first torque transfer location and coupled to the second planet carrier at a second torque transfer location, different to the first torque transfer location.

16 Claims, 5 Drawing Sheets

(56) References Cited

U.S. PATENT DOCUMENTS

| | | | | |
|---|---|---|---|---|
| 8,667,688 B2* | 3/2014 | McCune | ............... | F16H 57/082 29/893.1 |
| 8,814,746 B2* | 8/2014 | Fox | ...................... | F16H 1/2836 475/331 |
| 8,907,517 B2* | 12/2014 | Mongeau | ............. | H02K 7/1838 290/55 |
| 2011/0105270 A1 | 5/2011 | Matsuoka et al. | | |
| 2011/0275477 A1* | 11/2011 | Hsieh | ........................ | F16H 1/46 475/331 |
| 2014/0031163 A1 | 1/2014 | Coffin | | |
| 2014/0309078 A1 | 10/2014 | Curti et al. | | |
| 2016/0097330 A1* | 4/2016 | Venter | .................... | F01D 15/12 415/122.1 |

* cited by examiner

Fig.4
Fig.5
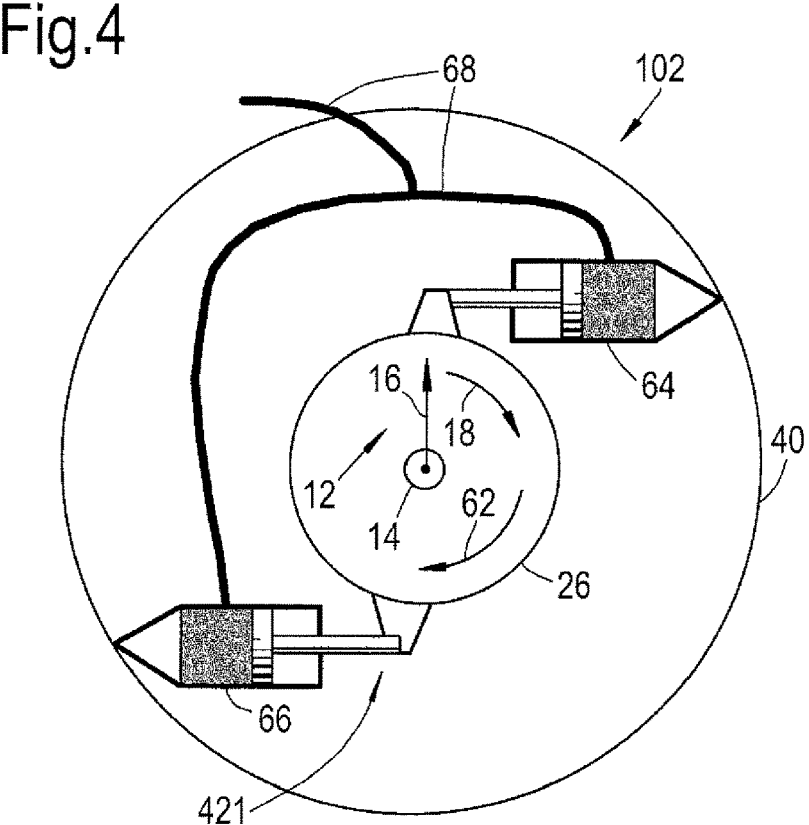
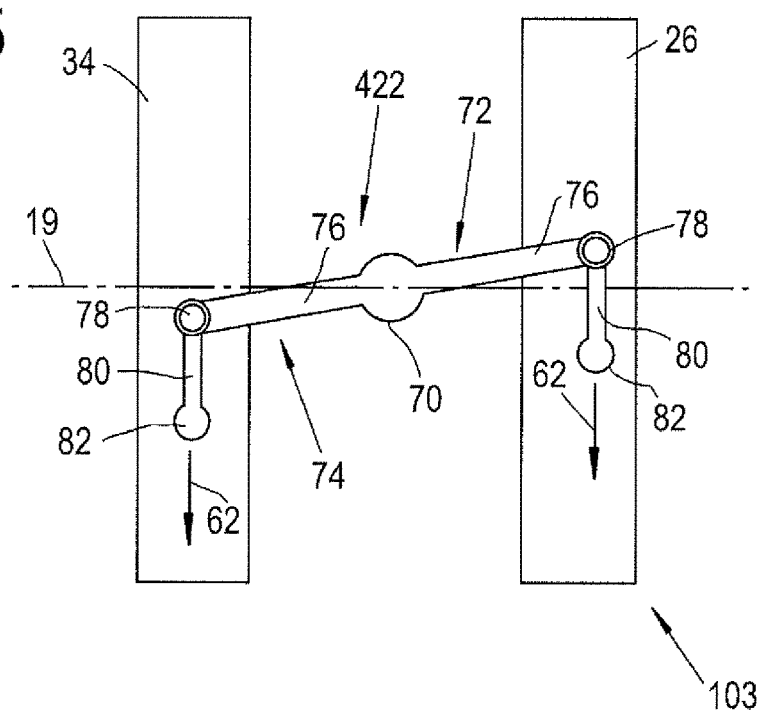

GEAR TRAINS

TECHNOLOGICAL FIELD

The present disclosure concerns gear trains.

BACKGROUND

Gas turbine engines may comprise a gear train in the torque transfer path from a turbine to a compressor and/or fan. Where the gas turbine engine is arranged to provide a large amount of power, the gear train may have a large diameter to withstand the relatively high torque transferred from the turbine. However, a large diameter may result in the gear train being subjected to large centrifugal forces (due to rotation of the planet gears for example) which may cause wear and subsequent failure of the gear train. The requirement for a large diameter gearbox may also lead to design compromises in other aspects of the engine such as restriction of the main gas path and increased weight.

BRIEF SUMMARY

According to various, but not necessarily all, embodiments there is provided a gear train comprising: an input shaft; a first sun gear coupled to the input shaft; a plurality of first planet gears engaging the first sun gear; a first ring gear engaging the plurality of first planet gears; and a first planet carrier coupled to the plurality of first planet gears; a second sun gear coupled to the input shaft; a plurality of second planet gears engaging the second sun gear; a second ring gear engaging the plurality of second planet gears; and a second planet carrier coupled to the plurality of second planet gears; and an output member coupled to the first planet carrier at a first torque transfer location and coupled to the second planet carrier at a second torque transfer location, different to the first torque transfer location.

The output member may extend between the first planet carrier and the second planet carrier.

The gear train may have a longitudinal axis and the output member may extend parallel to the longitudinal axis of the gear train.

The first planet carrier and the second planet carrier may define a first axial length there between. The output member may have a second axial length, greater than the first axial length.

The output member may encompass the first sun gear and the second sun gear.

The output member may define a plurality of apertures. The plurality of first planet gears may extend through a first subset of the plurality of apertures. The plurality of second planet gears may extend through a second subset of the plurality of apertures.

The output member may comprise an output shaft.

The gear train may further comprise a member extending between the first ring gear and the second ring gear. The member may be arranged to extend to a casing to restrict rotational movement of the first ring gear and the second ring gear relative to the casing.

The member may be configured to control the restricted rotation of the first ring gear and the second ring gear to control torque distribution between the first and second ring gears.

The member may comprise: a plurality of first hydraulic cylinders extending between the first ring gear and the casing; a plurality of second hydraulic cylinders extending between the second ring gear and the casing, wherein the plurality of first hydraulic cylinders are hydraulically connected to the plurality of second hydraulic cylinders.

The member may be pivotally connected to the casing between the first ring gear and the second ring gear. The member may include a first arm connected to the first ring gear and a second arm connected to the second ring gear.

The member may comprise a sensor, an electrical actuator, and a controller that is configured to control the electrical actuator to balance torque distribution using information sensed by the sensor.

The member may comprise a link having a low stiffness to restrict the first ring gear and the second ring gear from rotating such that small rotational movements of the first and second ring gears produce small changes in torque reaction.

The gear train may further comprise: a third sun gear coupled to the input shaft; a plurality of third planet gears engaging the third sun gear; a third ring gear engaging the plurality of third planet gears; and a third planet carrier coupled to the plurality of third planet gears; the output member being coupled to the third planet carrier at a third torque transfer location, different to the first torque transfer location and to the second torque transfer location.

The gear train may be for a gas turbine engine.

According to various, but not necessarily all, embodiments there is provided a gas turbine engine comprising a gear train as described in any of the preceding paragraphs.

The gas turbine engine may further comprise: a fan; a compressor; and a turbine, the input shaft of the gear train being coupled to the turbine and the output member of the gear train being coupled to the fan and/or the compressor.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which:

FIG. 4 illustrates an end view of a third gear train according to various examples;

FIG. 5 illustrates a plan view of a fourth gear train according to various examples;

DETAILED DESCRIPTION

In the following description, the terms 'connected' and 'coupled' mean operationally connected and coupled. It should be appreciated that there may be any number of intervening components between the mentioned features, including no intervening components.

Figure 1:
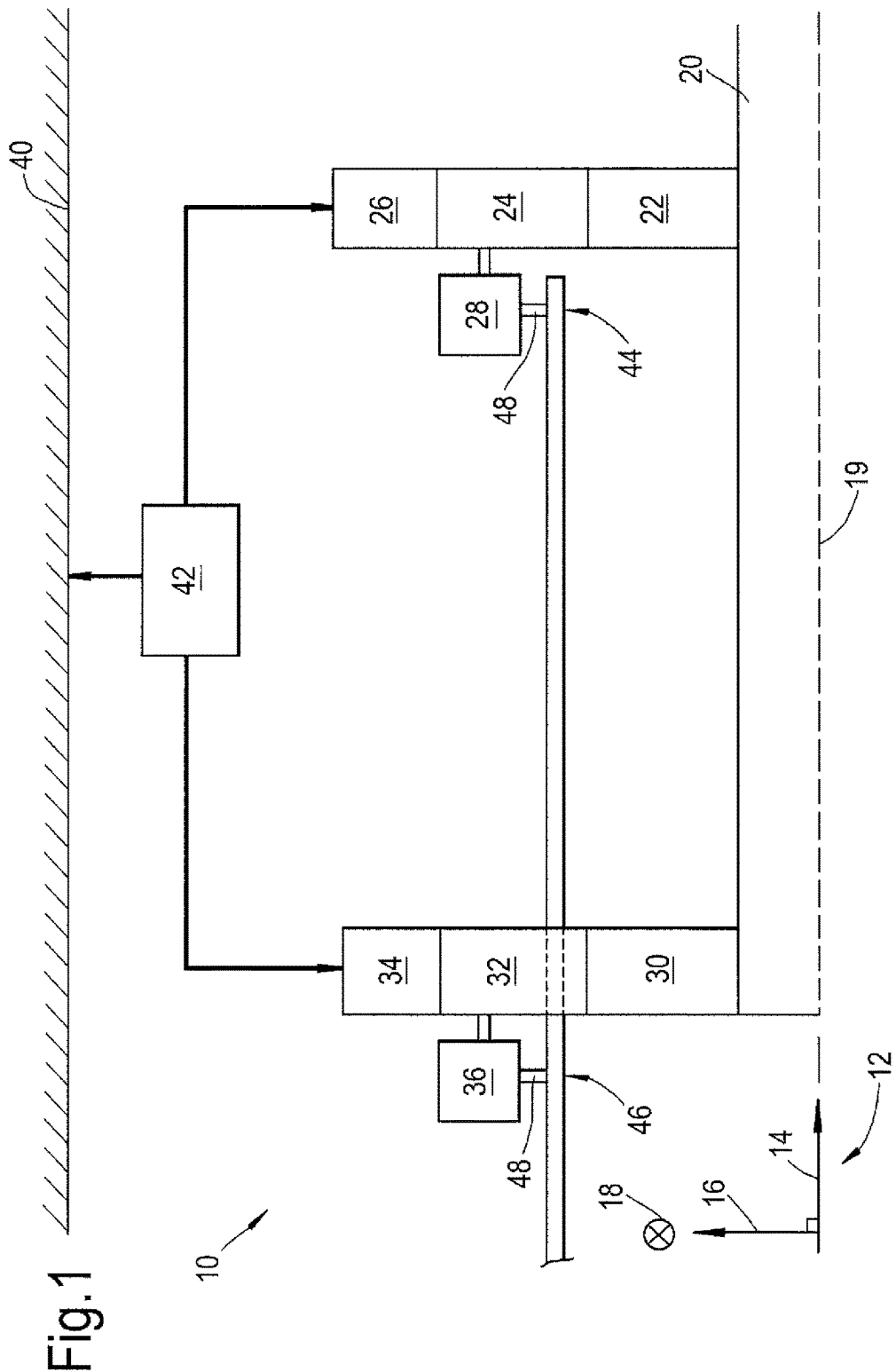
FIG. 1 illustrates a cross sectional side view of a first gear train according to various examples.
Figure 7:
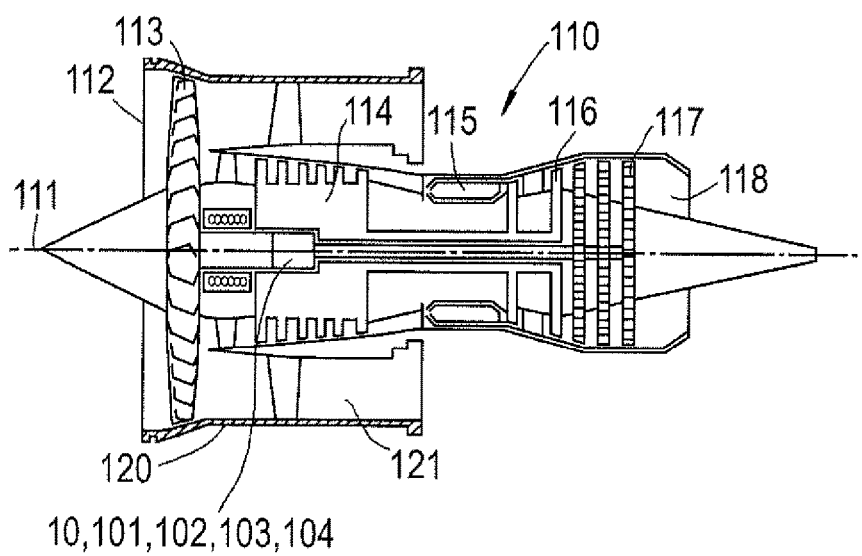
FIG. 7 illustrates a cross sectional side view of a gas turbine engine comprising a gear train according to various examples.

FIG. 1 illustrates a cross sectional side view of a first gear train 10 (which may also be referred to as a gearbox) and a cylindrical polar coordinate system 12. The first gear train 10 may be used in a drive train of a mechanical system. For example, the first gear train 10 may be provided in a torque transfer path from a turbine to a compressor and/or fan of a gas turbine engine (as illustrated in FIG. 7). In other examples, the first gear train 10 may be used in the drive train of a marine propulsion system or in the drive train of a wind turbine.

The cylindrical polar coordinate system 12 includes a longitudinal axis 14 (which may also be referred to as a cylindrical axis), a polar axis 16, and an azimuthal axis 18. The longitudinal axis 14, the polar axis 16 and the azimuthal axis 18 are orthogonal to one another.

The first gear train 10 has a longitudinal axis 19 and includes: an input shaft 20; a first sun gear 22; a plurality of first planet gears 24; a first ring gear 26; a first planet carrier 28; a second sun gear 30; a plurality of second planet gears 32; a second ring gear 34; a second planet carrier 36; and an output member 38. In some examples, the first gear train 10 may additionally include a casing 40 and a member 42.

The input shaft 20 may be coupled to a source of torque (such as a turbine of a gas turbine engine) and is arranged to rotate about the longitudinal axis 19 in the direction of the azimuthal axis 18. The first sun gear 22 is coupled to the input shaft 20 and is therefore also arranged to rotate about the longitudinal axis 19. The first planet gears 24 engage the first sun gear 22 (in other words, the teeth of the first planet gears 24 mesh with the teeth of the first sun gear 22) and are arranged to rotate about the first sun gear 22. The first ring gear 26 is arranged to engage the first planet gears 24 (in other words, the teeth of the ring gear 26 mesh with the teeth of the first planet gears 24). The first planet carrier 28 is coupled to the first planet gears 24 and is arranged to rotate about the longitudinal axis 19.

The second sun gear 30 is coupled to the input shaft 20 at a different location along the longitudinal axis 19 to the first sun gear 22. The second sun gear 30 is arranged to rotate about the longitudinal axis 19 in the direction of the azimuthal axis 18. The second planet gears 32 engage the second sun gear 30 (in other words, the teeth of the second planet gears 32 mesh with the teeth of the second sun gear 30) and are arranged to rotate about the second sun gear 30. The second ring gear 34 is arranged to engage the second planet gears 32 (in other words, the teeth of the second ring gear 34 mesh with the teeth of the second planet gears 32). The second planet carrier 36 is coupled to the second planet gears 32 and is arranged to rotate about the longitudinal axis 19.

The output member 38 may have any suitable structure for providing an output of torque from the gear train 10. For example, the output member 38 may include one or more rods having longitudinal axes that rotate around the longitudinal axis 19. In other examples, the output member 38 may be a tube having a longitudinal axis that coincides with the longitudinal axis 19 (in other words, the longitudinal axis 19 is also the longitudinal axis of the tubular output member 38). The longitudinal axis of the output member 38 may be oriented parallel to the longitudinal axis 19 of the gear train 10.

The output member 38 extends between the first planet carrier 28 and the second planet carrier 36. As illustrated in FIG. 1, the first planet carrier 28 and the second planet carrier 36 define a first axial length there between. The output member 38 has a second axial length that is greater than the first axial length.

The output member 38 is coupled to the first planet carrier 28 at a first torque transfer location 44 and is coupled to the second planet carrier 36 at a second torque transfer location 46, different to the first torque transfer location 44. The first and second planet carriers 28, 36 may be coupled to the output member 38 via any suitable connector 48 for transferring torque from the first and second planet carriers 28, 36 to the output member 38. For example, the first and second planet carriers 28, 36 may be coupled to the output member 38 via pins, coupled ball joints, flexural links and so on.

The casing 40 may be a casing of the gear train 10, or may be a casing of the mechanical system in which the gear train 10 is included. For example, where the gear train 10 is included within a gas turbine engine, the casing 40 may be a casing of the gas turbine engine. The casing 40 is static relative to the longitudinal axis 19 of the gear train 10 (in other words, the casing 40 does not rotate or move relative to the longitudinal axis 19 other than that required to allow small movements required to accommodate normal manufacturing tolerance and alignment issues).

The member 42 (which may also be referred to as a 'torque balancer') is described in greater detail in the following paragraphs with reference to FIGS. 4, 5, and 6. In summary, the member 42 extends between the first ring gear 26, the second ring gear 34 and the casing 40 (where present) to restrain rotational movement of the first ring gear 26 and the second ring gear 34 relative to the casing 40.

Figure 2:
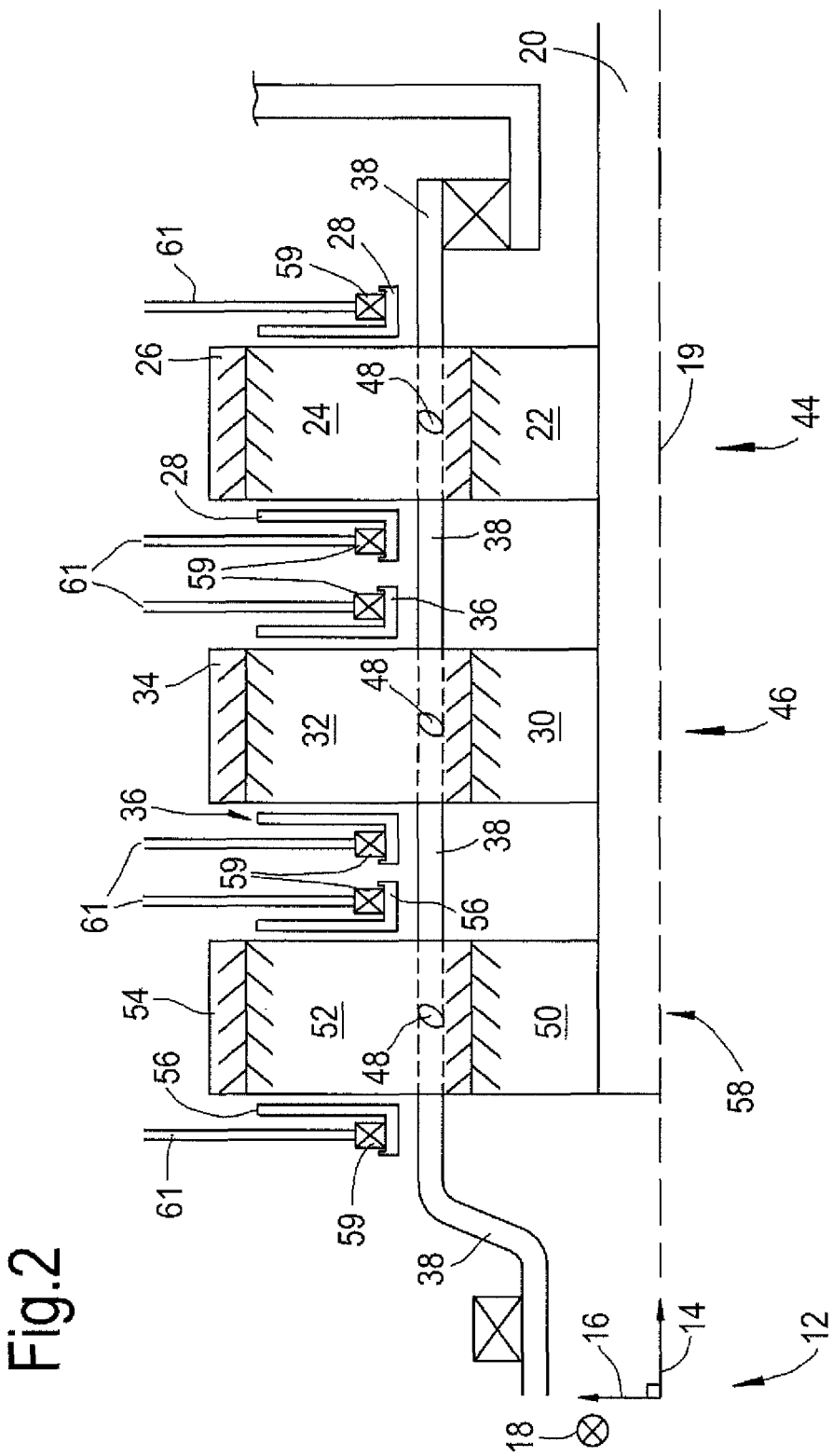
FIG. 2 illustrates a cross sectional side view of a second gear train according to various examples.

It should be appreciated that in other examples, the gear train 10 may include more than two gear train sections (where a gear train section includes a sun gear, a set of planet gears, a ring gear, and a planet carrier). For example, FIG. 2 illustrates a cross sectional side view of a second gear train 101 according to various examples. The second gear train 101 is similar to the first gear train 10 and where the features are similar, the same reference numerals are used.

The second gear train 101 differs from the first gear train 10 in that the second gear train 101 comprises three gear train sections. In more detail, the second gear train 101 additionally includes a third sun gear 50, a plurality of third planet gears 52, a third ring gear 54 and a third planet carrier 56.

The third sun gear 50 is coupled to the input shaft 20 at a different location along the longitudinal axis 19 to the first sun gear 22 and the second sun gear 30. The third sun gear 50 is arranged to rotate about the longitudinal axis 19 in the direction of the azimuthal axis 18. The third planet gears 52 engage the third sun gear 50 (in other words, the teeth of the third planet gears 52 mesh with the teeth of the third sun gear 50) and are arranged to rotate about the third sun gear 50. The third ring gear 54 is arranged to engage the third planet gears 52 (in other words, the teeth of the third ring gear 54 mesh with the teeth of the third planet gears 52). The second planet carrier 36 is coupled to the second planet gears 32 and is arranged to rotate about the longitudinal axis 19.

The output member 38 is coupled to the third planet carrier 56 at a third torque transfer location 58 that is different to the first torque transfer location 44 and the second torque transfer location 46. The third planet carrier 56 may be coupled to the output member 38 via any suitable connector 48 for transferring torque from the third planet carrier 56 to the output member 38. For example, the third planet carrier 56 may be coupled to the output member 38 via one or more pins, one or more coupled ball joints, one or more flexural links and so on.

The location of the coupling point 48 may be chosen to minimise the distortion of the planet carriers 28, 36, 56 and hence minimise misalignment between the gears, for example, the sun, planet and ring gears 22, 24, 26. One embodiment may have an arrangement where the planet carrier 28 is symmetrical about a radial plane which passes through the coupling point 48. That is, the loads applied by the torque on the planet carrier 28 are balanced to prevent distortion or misalignment of the planet carrier 28 and hence gear meshes.

Figure 3:
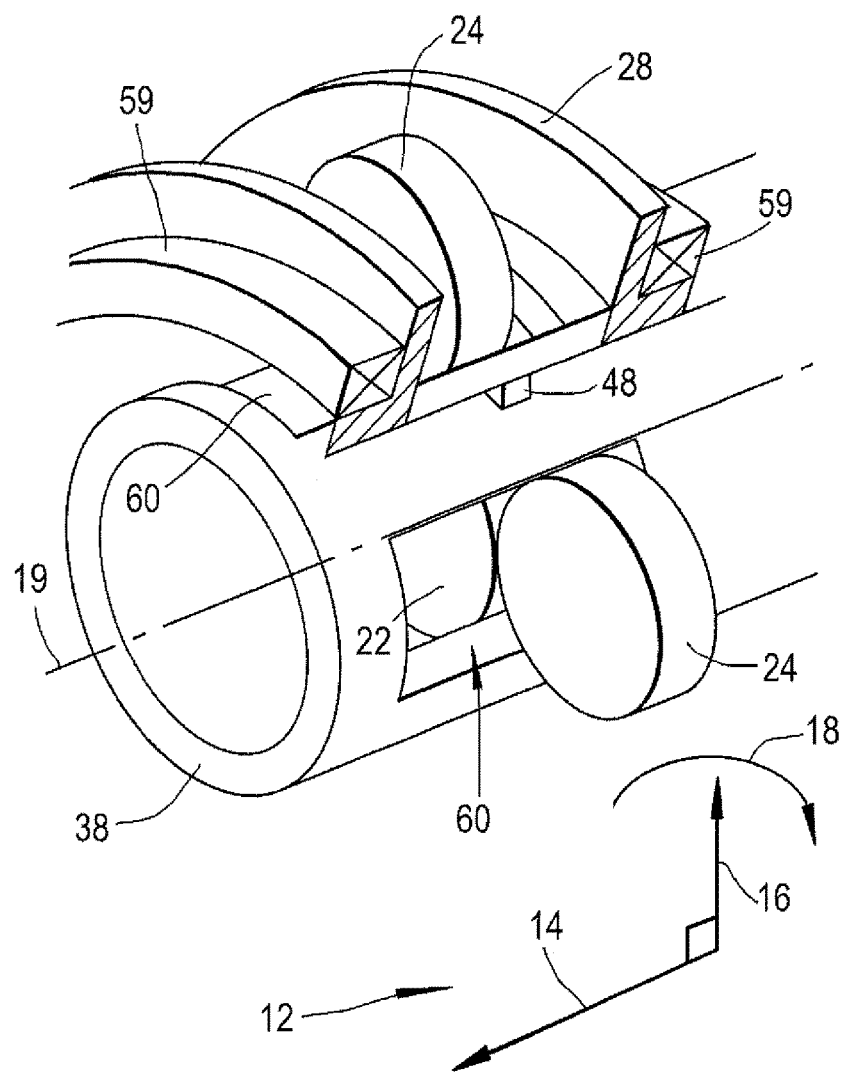
FIG. 3 illustrates a cross sectional perspective view of a part of the second gear train illustrated in FIG. 2.

The second gear train 101 also differs from the first gear train 10 in that the output member 38 includes a tube that defines a plurality of apertures. FIG. 3 illustrates a cross sectional perspective view of a part of the second gear train 101 illustrated in FIG. 2 where the output member 38 defines a plurality of rectangular apertures 60.

The plurality of first planet gears 24 extend through a first subset of the plurality of apertures 60. The plurality of second planet gears 32 extend through a second subset of the plurality of apertures 60 (not illustrated in the figures to maintain clarity). The plurality of third planet gears 52 extend through a third subset of the plurality of apertures 60 (also not illustrated in the figures to maintain clarity). The plurality of apertures 60 enable the first, second and third planet gears 24, 32, 52 to engage the first, second and third sun gears 22, 30, 50 respectively.

In operation, the output member 38 rotates along the azimuthal axis 18 at the same frequency as the orbit of the first, second and third planet gears 24, 32, 52 (since the output member 38 is coupled to the first, second and third planet carriers 28, 36, 56 via the connectors 48) and consequently, the apertures 60 remain aligned with the first, second and third planet gears 24, 32, 52.

It should be appreciated that an output member 38 defining a plurality of apertures 60 is not limited to this example where the gear train 101 has three gear train sections. An output member 38 defining a plurality of apertures 60 may be used in gear trains having any number of gear train sections. Furthermore, it should be appreciated that the plurality of apertures 60 may have a different shape and may be square, circular or elliptical for example.

FIG. 2 shows additional detail of an embodiment of the mounting of the planet carriers 28, 36, 56. The planet carriers are constrained to rotate about the central axis of the gearbox by bearings 59 which are mounted in a structure 61 which connects directly or indirectly to the casing 40.

FIG. 4 illustrates an end view of a third gear train 102 and the cylindrical coordinate system 12. The third gear train 102 is similar to the first and second gear trains 10, 101 and where the features are similar, the same reference numerals are used. The third gear train 102 includes a first member 421 for restricting rotational movement 62 of the first ring gear 26 and the second ring gear 34 (not illustrated in FIG. 4) relative to the casing 40.

In more detail, the first member 421 includes a first hydraulic cylinder 64, a second hydraulic cylinder 66, a hydraulic connector 68, a third hydraulic cylinder (not illustrated) and a fourth hydraulic cylinder (not illustrated).

The first hydraulic cylinder 64 is connected to the first ring gear 26 and extends towards and abuts the casing 40. The second hydraulic cylinder 66 is connected to the first ring gear 26 (on the opposite side of the first ring gear 26 to the first hydraulic cylinder 64) and extends towards and abuts the casing 40. The third hydraulic cylinder is connected to the second ring gear 34 and extends towards and abuts the casing 40. The fourth hydraulic cylinder is connected to the second ring gear 34 (on the opposite side of the second ring gear 34 to third hydraulic cylinder) and extends towards and abuts the casing 40. The hydraulic connector 68 extends between first hydraulic cylinder 64, the second hydraulic cylinder 66, the third hydraulic cylinder and the fourth hydraulic cylinder.

In operation, the first and second ring gears 26, 34 receive torque 62 from the first planet gears 24 and the second planet gears 32. The torque 62 generates a static pressure in the first, second, third and fourth hydraulic cylinders and since the first, second, third and fourth hydraulic cylinders are connected via the hydraulic connector 68, the first ring 26 and the second ring gear 34 are restricted from rotating. The first member 421 may accommodate windup between the first and second sun gears 22, 30, windup in the output member 38, and differences in manufacturing errors. With the first and second gear train sections being arranged to react the same torque, the first member 421 may advantageously enable power to be evenly distributed between the first and second gear train sections.

It should be appreciated that while the first member 421 has been described with reference to the first gear train 10, the first member 421 may be used with the second gear train 101 (or another gear train having a greater number of gear train sections). In such examples, the first member 421 includes an additional pair of hydraulic cylinders for each additional ring gear that are connected to the first, second, third and fourth hydraulic cylinders via the hydraulic connector 68.

It should also be appreciated that the same balancing effect can be achieved with any number of cylinders per gear train.

FIG. 5 illustrates a plan view of a fourth gear train 103 according to various examples. The fourth gear train 103 is similar to the first, second and third gear trains 10, 101, 102 and where the features are similar, the same reference numerals are used. The fourth gear train 103 includes a second member 422 for restricting rotational movement 62 of the first ring gear 26 and the second ring gear 34 relative to the casing 40 (not illustrated in FIG. 5 to maintain clarity).

The second member 422 is pivotally connected to the casing 40 between the first ring gear 26 and the second ring gear 34 at a pivot 70. The second member 422 includes: a first arm 72 connected to the first ring gear 26 and to the pivot 70; and a second arm 74 connected to the second ring gear 34 and to the pivot 70.

The first arm 72 includes a first arm portion 76, a first pivot 78, a second arm portion 80 and a second pivot 82. The first arm portion 76 is coupled to the pivot 70 and to the first pivot 78. The second arm portion 80 is coupled to the first pivot 78 and to the second pivot 82. The second pivot 82 is connected to the first ring gear 26.

The second arm 74 has a similar structure to the first arm 72 and consequently also includes a first arm portion 76, a first pivot 78, a second arm portion 80 and a second pivot 82. The first arm portion 76 is coupled to the pivot 70 and to the first pivot 78. The second arm portion 80 is coupled to the first pivot 78 and to the second pivot 82. The second pivot 82 is connected to the second ring gear 34.

In operation, the first and second ring gears 26, 34 receive torque 62 from the first planet gears 24 and the second planet gears 32. The torque 62 on the first ring gear 26 causes the second member 422 to rotate clockwise about the pivot 70, whereas the torque 62 on the second ring gear 34 causes the second member 422 to rotate anti-clockwise about the pivot 70. Consequently, the first ring gear 26 is restricted from moving due to the torque 62 on the second ring gear 34 and similarly, the second ring gear 34 is restricted from moving due to the torque 62 on the first ring gear 26. With the first and second gear train sections being arranged to react the same torque, the second member 422 may advantageously enable power to be evenly distributed between the first and second gear train sections.

Figure 6:
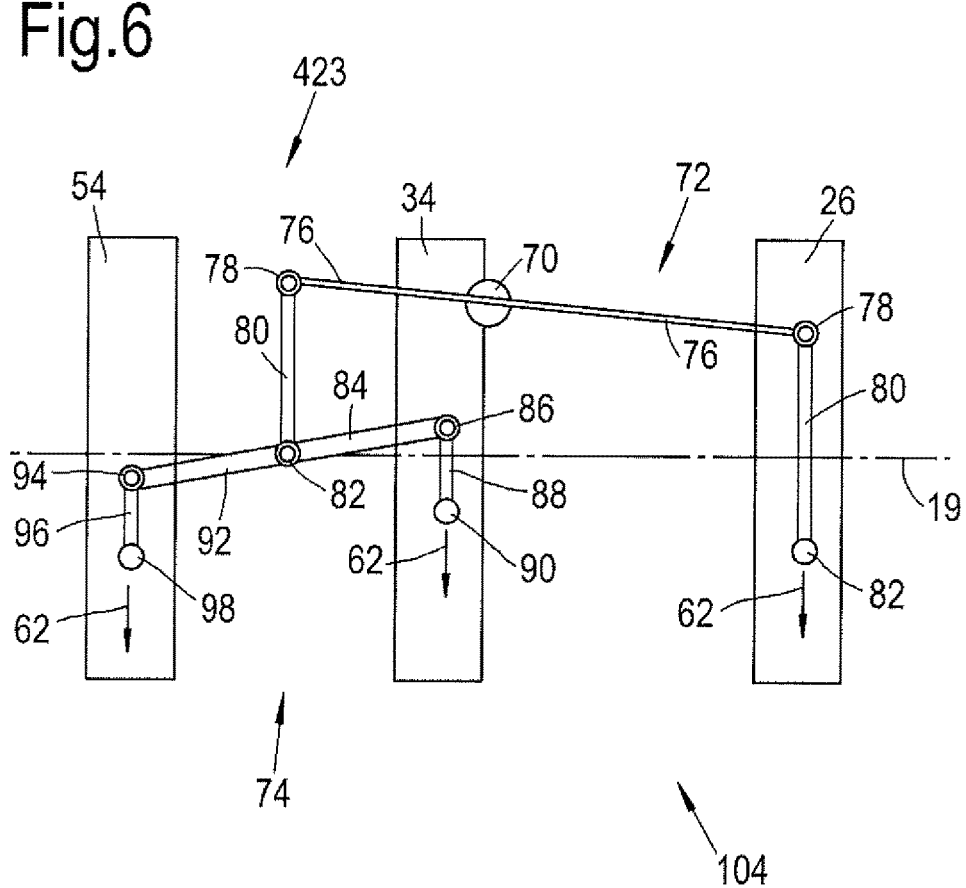
FIG. 6 illustrates a plan view of a fifth gear train according to various examples.

FIG. 6 illustrates a plan view of a fifth gear train 104 according to various examples. The fifth gear train 104 is similar to the first, second, third and fourth gear trains 10, 101, 102, 103 and where the features are similar, the same reference numerals are used. The fifth gear train 104 includes a third member 423 for restricting rotational movement 62 of the first ring gear 26, the second ring gear 34, and the third ring gear 54 relative to the casing 40 (not illustrated in FIG. 6 to maintain clarity).

The third member 423 is pivotally connected to the casing 40 at a pivot 70. The third member 423 includes: a first arm 72 connected to the first ring gear 26 and to the pivot 70; and a second arm 74 connected to the second ring gear 34, the third ring gear 54 and to the first arm 72.

The first arm 72 includes a first arm portion 76, a first pivot 78, a second arm portion 80 and a second pivot 82. The first arm portion 76 is coupled to the pivot 70 and to the first pivot 78. The second arm portion 80 is coupled to the first pivot 78 and to the second pivot 82. The second pivot 82 is connected to the first ring gear 26.

The second arm 74 includes a first arm portion 76, a first pivot 78, a second arm portion 80, a second pivot 82, a third arm portion 84, a third pivot 86, a fourth arm portion 88, a fourth pivot 90, a fifth arm portion 92, a fifth pivot 94, a sixth arm portion 96 and a sixth pivot 98.

The first arm portion 76 is coupled to the pivot 70 and to the first pivot 78 and is constrained to rotate about the pivot 70. The second arm portion 80 is coupled to the first pivot 78 and to the second pivot 82. The third arm portion 84 is coupled to the second pivot 82 and to the third pivot 86. The fourth arm portion 88 is coupled to the third pivot 86 and to the fourth pivot 90. The fourth pivot 90 is coupled to the second ring gear 34. The fifth arm portion 92 is coupled to the second pivot 82 and to the fifth pivot 94. The sixth arm portion 96 is coupled to the fifth pivot 94 and to the sixth pivot 98. The sixth pivot 98 is coupled to the second ring gear 34. The arm portions 84 and 92 are rigidly connected to rotate in unison about pivot 82.

In operation, the first, second and third ring gears 26, 34, 54 receive torque 62 from the first planet gears 24, the second planet gears 32 and the third planet gears 52 respectively. The torque 62 on the first ring gear 26 causes the third member 423 to rotate clockwise about the pivot 70, whereas the torque 62 on the second ring gear 34 and the third ring gear 54 causes the third member 423 to rotate anti-clockwise about the pivot 70. Consequently, the first ring gear 26 is restricted from moving due to the torque 62 on the second ring gear 34 and the third ring gear 54 and similarly, the second ring gear 34 and the third ring gear 54 are restricted from moving due to the torque 62 on the first ring gear 26.

The torque 62 on the second ring gear 34 causes rotation clockwise about the second pivot 82, and the torque 62 on the third ring gear 54 causes rotation anticlockwise about the second pivot 82. Therefore, the second ring gear 34 is restricted from moving due to the torque 62 on the third ring gear 54, and the third ring gear 54 is restricted from moving due to the torque 62 on the second ring gear 34.

With the first, second and third gear train sections being arranged to react the same torque, the third member 423 may advantageously enable power to be evenly distributed between the first, second and third gear train sections. In this example, the axial lengths of the arm portions 84 and 92 are the same to provide a balance between the second third ring gears 34 and 54. The lengths of the first arm portions 76 either side of the pivot 70 are in the ratio of one to three and two to three to provide a balance across all three gears stages.

The description above describes hydrostatic and lever systems to provide a balance of torque between the ring gears. Other mechanisms could be employed to provide this same function such as pneumatic, electrical, cable etc. which should be obvious to anyone skilled in the art.

The torque reacting mechanism could also be provided by a low stiffness spring mechanism so that small rotational movements of the ring gears produce small changes in torque. The hydraulic cylinders shown in FIG. 4 would be replaced by a low stiffness spring with no interconnection between the ring gears.

The gear train 10, 101, 102, 103, 104 may be advantageous in that torque is transferred from both the first planet carrier 28 and the second planet carrier 36 to the output member 38. This sharing of torque between at least a first gear train section (that is, the first sun gear 22, the first planet gears 24, the first ring gear 26 and the first planet carrier 28) and a second gear train section (that is, the second sun gear 30, the second planet gears 32, the second ring gear 34, and the second planet carrier 36) may enable the diameter and weight of the gear train to be reduced. This may enable the gear train to be installed within an intermediate pressure compressor of a gas turbine engine and may advantageously enable the length of the gas turbine engine to be reduced.

Furthermore, the first and second planet gears 24, 32 may have reduced mass and radius and advantageously provide a reduced centrifugal load on the gear train 10, 101, 102, 103, 104.

Additionally, the gear train 10, 101, 102, 103, 104 may advantageously be mass produced and the number of gear train sections may be selected in dependence upon the input torque. For example, a low torque mechanical system may comprise two gear train sections, a medium torque mechanical system may comprise three gear train sections, and a high torque mechanical system may comprise four gear train sections.

With reference to FIG. 7, a gas turbine engine is generally indicated at 110, having a principal and rotational axis 111. The engine 110 comprises, in axial flow series, an air intake 112, a propulsive fan 113, a gear train 10, 101, 102, 103, 104, a high-pressure compressor 114, combustion equipment 115, a high-pressure turbine 116, a low-pressure turbine 117 and an exhaust nozzle 118. A nacelle 120 generally surrounds the engine 110 and defines the intake 112.

The gas turbine engine 110 operates such that air entering the intake 112 is accelerated by the fan 113 to produce two air flows: a first air flow into the high-pressure compressor 114 and a second air flow which passes through a bypass duct 121 to provide propulsive thrust. The high-pressure compressor 114 compresses the air flow directed into it before delivering that air to the combustion equipment 115.

In the combustion equipment 115 the air flow is mixed with fuel and the mixture combusted. The resultant hot combustion products then expand through, and thereby drive the high and low-pressure turbines 116, 117 before being exhausted through the nozzle 118 to provide additional propulsive thrust. The high 116 and low 117 pressure turbines drive respectively the high pressure compressor 114 and the fan 113, each by suitable interconnecting shaft. The gear train 10, 101, 102, 103, 104 is provided in the drive train from a turbine 116, 117 to the compressor 114 and/or the fan 113.

Other gas turbine engines to which the present disclosure may be applied may have alternative configurations. By way of example such engines may have an alternative number of interconnecting shafts (e.g. three) and/or an alternative number of compressors and/or turbines.

It will be understood that the invention is not limited to the embodiments above-described and various modifications and improvements can be made without departing from the concepts described herein. For example, the planet carriers 28, 36, 56 may be connected together via a connector, and the connector may be connected to a single point on the output member 38. In other words, the first, second and third torque transfer locations 44, 46, 58 may be locations where the planet carriers 28, 36, 56 are connected to the connector, and the connector may be connected to the output member 38 at one or more further torque transfer locations.

By way of another example, the member 42 may have an alternative structure to those described above and may comprise a sensor, an electrical actuator, and a controller that is configured to control the electrical actuator to balance torque using information sensed by the sensor.

By way of a further example, the ring gears may be restricted from rotating by a link having a low stiffness such that small rotational movements of the ring gears produce small changes in the torque reaction.

Except where mutually exclusive, any of the features may be employed separately or in combination with any other features and the disclosure extends to and includes all combinations and sub-combinations of one or more features described herein.

What is claimed is:

1. A gear train comprising:
    an input shaft;
    a first sun gear coupled to the input shaft; a plurality of first planet gears engaging the first sun gear; a first ring gear engaging the plurality of first planet gears; and a first planet carrier coupled to the plurality of first planet gears;
    a second sun gear coupled to the input shaft; a plurality of second planet gears engaging the second sun gear; a second ring gear engaging the plurality of second planet gears; and a second planet carrier coupled to the plurality of second planet gears; and
    an output member coupled to the first planet carrier at a first torque transfer location and coupled to the second planet carrier at a second torque transfer location, different to the first torque transfer location, wherein the output member comprises a tube with a plurality of apertures for the first planet gears and second planet gears to extend therethrough, the tube extending between the first planet carrier and the second planet carrier, the tube being located entirely radially inward from central axis points of the first planet gears and the second planet gears.

2. A gear train as claimed in claim 1, wherein the gear train has a longitudinal axis and the output member extends parallel to the longitudinal axis of the gear train.

3. A gear train as claimed in claim 1, wherein the first planet carrier and the second planet carrier define a first axial length there between, the output member having a second axial length, greater than the first axial length.

4. A gear train as claimed in claim 1, wherein the output member encompasses the first sun gear and the second sun gear.

5. A gear train as claimed in claim 1, wherein the plurality of first planet gears extends through a first subset of the plurality of apertures, and the plurality of second planet gears extends through a second subset of the plurality of apertures.

6. A gear train as claimed in claim 1, wherein the output member comprises an output shaft.

7. A gear train as claimed in claim 1, further comprising a member extending between the first ring gear and the second ring gear, the member being arranged to extend to a casing to restrict rotational movement of the first ring gear and the second ring gear relative to the casing.

8. A gear train as claimed in claim 7, wherein the member is configured to control the restricted rotation of the first ring gear and the second ring gear to control torque distribution between the first and second ring gears.

9. A gear train as claimed in claim 7, wherein the member comprises: a plurality of first hydraulic cylinders extending between the first ring gear and the casing; a plurality of second hydraulic cylinders extending between the second ring gear and the casing, wherein the plurality of first hydraulic cylinders are hydraulically connected to the plurality of second hydraulic cylinders.

10. A gear train as claimed in claim 7, wherein the member is pivotally connected to the casing between the first ring gear and the second ring gear, the member including a first arm connected to the first ring gear and a second arm connected to the second ring gear.

11. A gear train as claimed in claim 7, wherein the member comprises a sensor, an electrical actuator, and a controller that is configured to control the electrical actuator to balance torque distribution using information sensed by the sensor.

12. A gear train as claimed in claim 7, wherein the member comprises a link having a low stiffness to restrict the first ring gear and the second ring gear from rotating such that small rotational movements of the first and second ring gears produce small changes in torque reaction.

13. A gear train as claimed in claim 1, further comprising:
    a third sun gear coupled to the input shaft; a plurality of third planet gears engaging the third sun gear; a third ring gear engaging the plurality of third planet gears; and a third planet carrier coupled to the plurality of third planet gears; the output member being coupled to the third planet carrier at a third torque transfer location, different to the first torque transfer location and to the second torque transfer location.

14. A gear train as claimed in claim 1, wherein the gear train is for a gas turbine engine.

15. A gas turbine engine comprising a gear train as claimed in claim 1.

16. A gas turbine engine as claimed in claim 15, further comprising: a fan; a compressor; and a turbine, the input shaft of the gear train being coupled to the turbine and the output member of the gear train being coupled to the fan and/or the compressor.

* * * * *